United States Patent [19]
Ikeguchi et al.

[11] Patent Number: 5,481,373
[45] Date of Patent: Jan. 2, 1996

[54] FACSIMILE APPARATUS AND TELEPHONE TERMINAL APPARATUS HAVING VOICE AND IMAGE COMMUNICATION FUNCTIONS

[75] Inventors: Yoshinori Ikeguchi; Hiroshi Murata, both of Fukuoka, Japan

[73] Assignee: Matsushita Electric Industrial Co., Ltd., Japan

[21] Appl. No.: 191,119

[22] Filed: Feb. 3, 1994

[30] Foreign Application Priority Data

Feb. 8, 1993 [JP] Japan .................................. 5-019808

[51] Int. Cl.⁶ .............................. H04N 1/32; H04N 1/327
[52] U.S. Cl. ........................ 358/434; 358/438; 358/468; 379/100
[58] Field of Search ...................... 358/468, 434, 358/435, 438, 440, 402, 403, 407, 442, 443; 379/100

[56] References Cited

U.S. PATENT DOCUMENTS

| | | | |
|---|---|---|---|
| 4,868,865 | 9/1989 | Ogawa et al. | 379/100 |
| 5,014,296 | 5/1991 | Saigano | 379/100 |
| 5,086,455 | 2/1992 | Satomi et al. | 379/100 |
| 5,113,432 | 5/1992 | Van Santbrink et al. | 379/100 |
| 5,151,972 | 9/1992 | Lorenz et al. | 379/100 |

Primary Examiner—Scott A. Rogers
Attorney, Agent, or Firm—Parkhurst, Wendel & Rossi

[57] ABSTRACT

In a facsimile apparatus with an external telephone unit connected thereto or in a telephone terminal apparatus having telephone and facsimile communication functions, when a particular code signal is sent through a telephone line during a telephone communication being effected, a facsimile communication is held ineffective. Accordingly, even when a particular situation occurs, which otherwise causes switching from the telephone communication to the facsimile communication, the telephone communication is held effective once the particular code signal is detected.

24 Claims, 5 Drawing Sheets

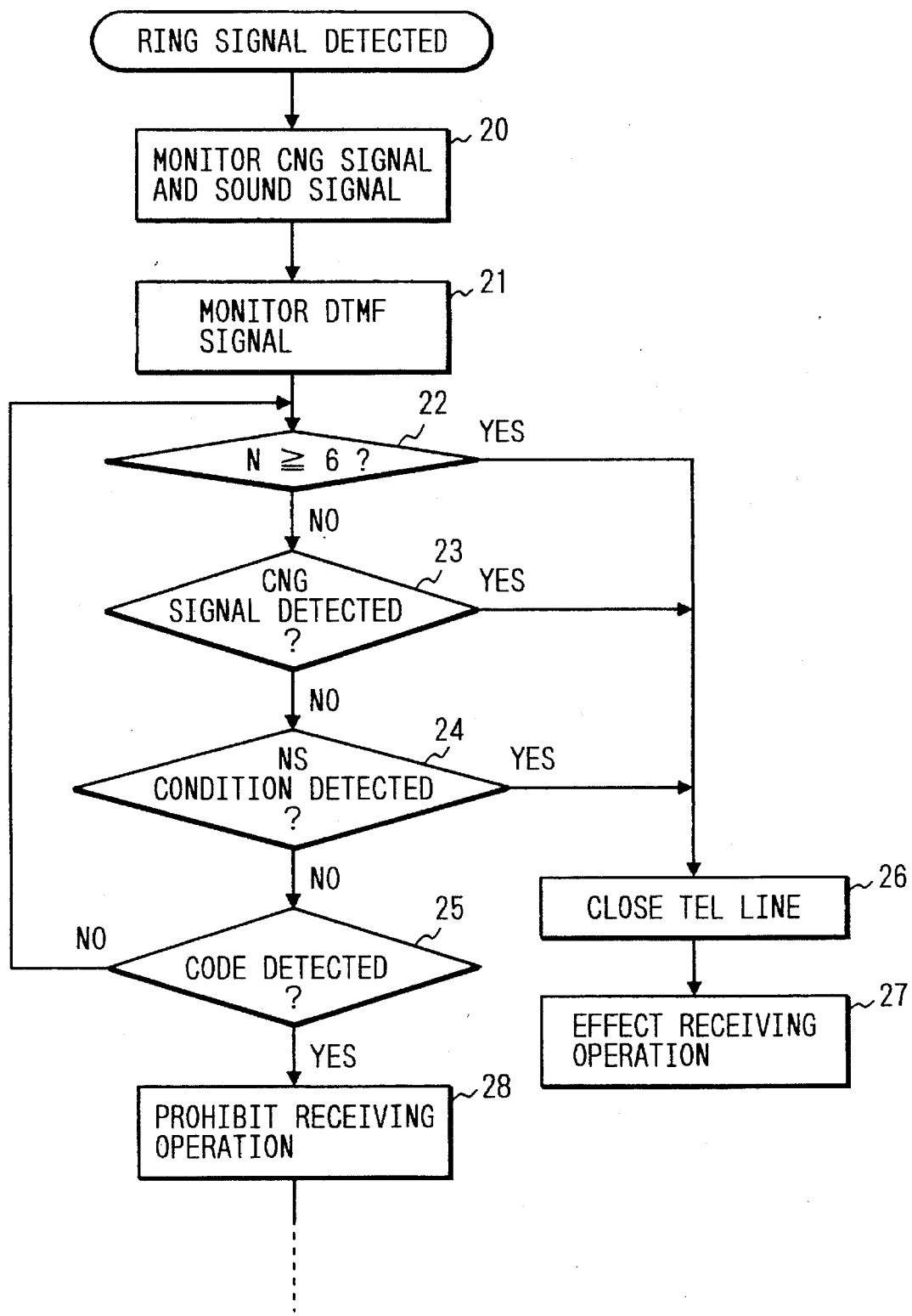

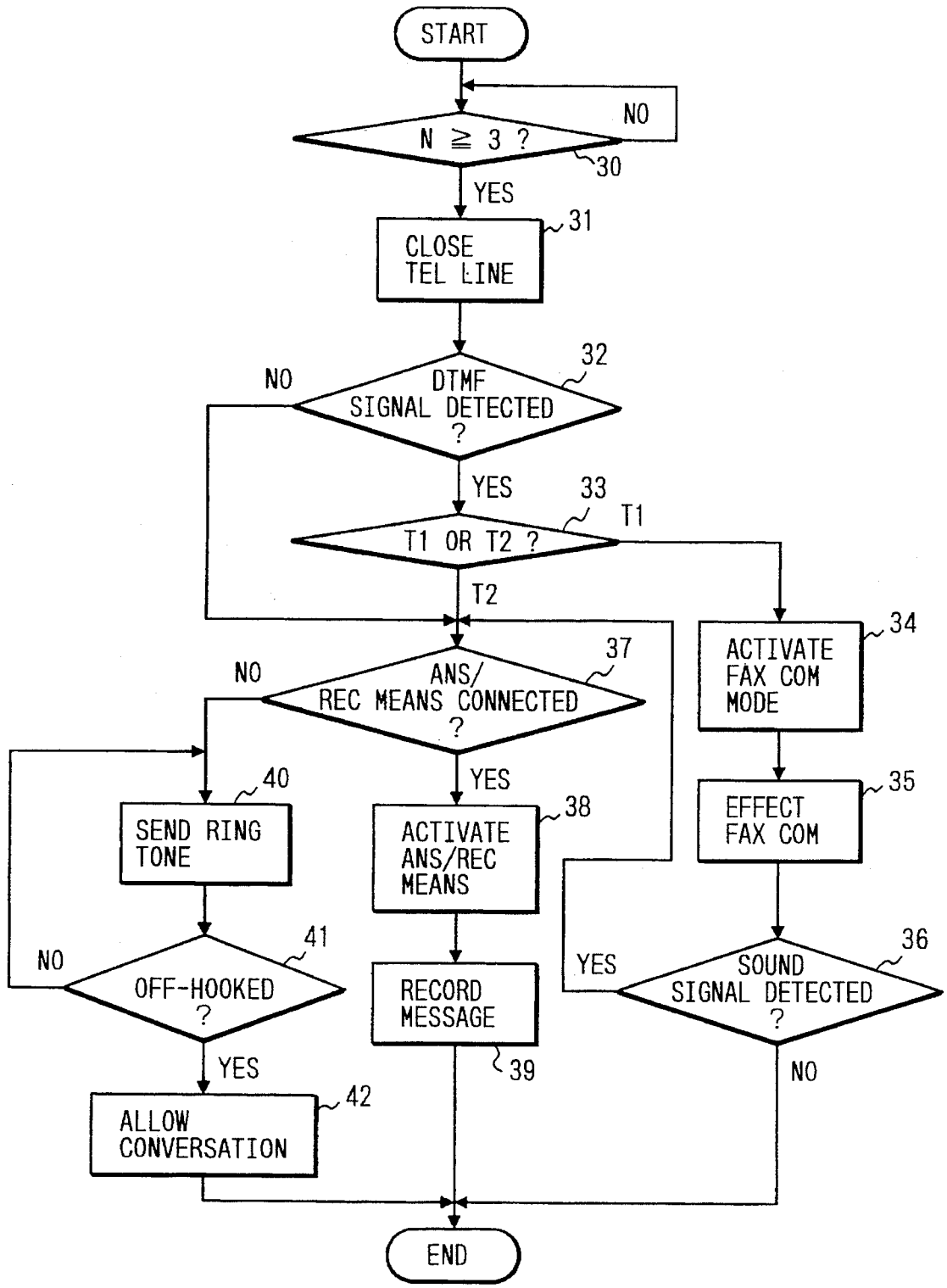

FACSIMILE APPARATUS AND TELEPHONE TERMINAL APPARATUS HAVING VOICE AND IMAGE COMMUNICATION FUNCTIONS

BACKGROUND OF THE INVENTION

1. Field of the Invention

The present invention relates to a facsimile apparatus to be used with an external telephone set connected thereto and to a telephone terminal apparatus having telephone (voice) and facsimile (image) communication functions, wherein selection between telephone and facsimile communications is controlled by monitoring particular signals sent through a telephone line.

2. Description of the Prior Art

There have been known facsimile apparatuses to be used with telephone sets connected thereto, including, such as, cordless telephone sets or automatic answering/recording telephone sets.

As is known, the automatic answering/recording telephone set (hereinafter referred to as "AARTS") is used for recording an incoming message from a caller and reproducing the recorded incoming message. The AARTS is generally provided with a remote control function which allows a user, for example, to hear the recorded incoming message from another telephone, such as, a public telephone.

In general, when using the remote control function, the user first makes a call to the AARTS. Thereafter, during the AARTS reproducing and sending a recorded outgoing message, the user inputs a specific ID code assigned to the AARTS using a pushbutton dial of the calling telephone so as to set the AARTS ready for the remote control. The user then inputs a predetermined numeric command (for example, [22]: rewind tape; [23]: reproduce or play back recorded incoming message) using the dial of the calling telephone so as to hear the recorded incoming message or in some cases to monitor a condition of a user's room.

On the other hand, in general, the facsimile apparatus is automatically set to an image signal receiving state when detecting a CNG signal or when detecting no sound signal for several seconds. The CNG signal is a facsimile communication start signal which is transmitted from a caller facsimile apparatus when the caller facsimile apparatus is operated under an automatic calling mode.

Conventionally, when the remote control is performed to the AARTS connected to the facsimile apparatus, the following problem has been encountered:

Specifically, when no sound signal is detected for several seconds, which is likely to occur during the AARTS rewinding the tape, the facsimile apparatus is automatically connected to the telephone line so as to be set to the image signal receiving state. As a result, the remote control of the AARTS becomes practically ineffective.

On the other hand, there has been available the so-called direct inward dialing (DID), wherein a plurality of phone numbers are assigned to one subscriber line corresponding to equipped terminal units, respectively, and when a call is made using one of the assigned phone numbers, a designation signal indicative of the corresponding terminal unit is sent from the telephone exchange. In the direct inward dialing, a particular adapter is used, working as switching means, for switching between the terminal units according to the received designation signal. Accordingly, when one of the terminal units is a telephone set and another thereof is a facsimile apparatus, the adapter switches between the telephone set and the facsimile apparatus according to the received designation signal, i.e. the dialed phone number.

However, in the direct inward dialing with such an adapter, once the telephone line is connected to the facsimile apparatus, the telephone line can not be connected to the telephone set unless another call is made. Accordingly, the image data and the voice message can not be transmitted in series during one call.

SUMMARY OF THE INVENTION

Therefore, it is an object of the present invention to provide an improved facsimile apparatus.

It is another object of the present invention to provide an improved telephone terminal apparatus.

According to one aspect of the present invention, a facsimile apparatus comprises facsimile communication means for performing a facsimile communication; means for connecting an external telephone unit; line switch means having a first state where a telephone line is connected to the external telephone unit and a second state where the telephone line is connected to the facsimile communication means; sound detecting means for detecting a sound signal sent through the telephone line; first control means for switching the line switch means from the first state to the second state so as to start the facsimile communication when no sound signal is detected over a predetermined time period by the sound detecting means; code detecting means for detecting a code based on a signal sent through the telephone line; and second control means for holding the first control means inoperative when the code detecting means detects a predetermined code based on the signal sent through the telephone line.

According to another aspect of the present invention, a facsimile apparatus comprises facsimile communication means for performing a facsimile communication; means for connecting an external telephone unit; line switch means having a first state where a telephone line is connected to the external telephone unit and a second state where the telephone line is connected to the facsimile communication means; sound detecting means for detecting a sound signal sent through the telephone line; storing means for storing a predetermined code; first control means for switching the line switch means from the first state to the second state so as to start the facsimile communication when no sound signal is detected over a predetermined time period by the sound detecting means; code detecting means for detecting a code based on a signal sent through the telephone line; and second control means for holding the first control means inoperative when the code detected by the code detecting means coincides with the predetermined code stored by the storing means.

According to another aspect of the present invention, a facsimile apparatus comprises facsimile communication means for performing a facsimile communication; means for connecting an external telephone unit; line switch means having a first state where a telephone line is connected to the external telephone unit and a second state where the telephone line is connected to the facsimile communication means; means for detecting a facsimile communication start signal sent through the telephone line; first control means for switching the line switch means from the first state to the second state so as to start the facsimile communication when the facsimile communication start signal is detected by the detecting means; code detecting means for detecting a code based on a signal sent through the telephone line; and second control means for holding the first control means inoperative when the code detecting means detects a predetermined code based on the signal sent through the telephone line.

According to another aspect of the present invention, a facsimile apparatus comprises facsimile communication means for performing a facsimile communication; means for connecting an external telephone unit; line switch means having a first state where a telephone line is connected to the external telephone unit and a second state where the telephone line is connected to the facsimile communication means; storing means for storing a predetermined code; means for detecting a facsimile communication start signal sent through the telephone line; first control means for switching the line switch means from the first state to the second state so as to start the facsimile communication when the facsimile communication start signal is detected by the detecting means; code detecting means for detecting a code based on a signal sent through the telephone line; and second control means for holding the first control means inoperative when the code detected by the code detecting means coincides with the predetermined code stored by the storing means.

According to another aspect of the present invention, a telephone terminal apparatus comprises facsimile communication means for performing a facsimile communication; voice communication means for performing a voice communication; switch means having a first state where a telephone line is connected to the voice communication means and a second state where the telephone line is connected to the facsimile communication means; means for detecting a facsimile communication start signal sent through the telephone line; first control means for controlling the switch means to the second state so as to start the facsimile communication when the facsimile communication start signal is detected by the detecting means; code detecting means for detecting a code based on a signal sent through the telephone line; and second control means for holding the first control means inoperative when the code detecting means detects a predetermined code based on the signal sent through the telephone line.

According to another aspect of the present invention, a telephone terminal apparatus comprises facsimile communication means for performing a facsimile communication; voice communication means for performing a voice communication; switch means having a first state where a telephone line is connected to the voice communication means and a second state where the telephone line is connected to the facsimile communication means; sound detecting means for detecting a sound signal sent through the telephone line; first control means for controlling the switch means to the second state so as to start the facsimile communication when no sound signal is detected over a predetermined time period by the sound detecting means; code detecting means for detecting a code based on a signal sent through the telephone line; and second control means for holding the first control means inoperative when the code detecting means detects a predetermined code based on the signal sent through the telephone line.

According to another aspect of the present invention, a telephone terminal apparatus comprises facsimile communication means for performing a facsimile communication; voice communication means for performing a voice communication; switch means having a first state where a telephone line is connected to the voice communication means and a second state where the telephone line is connected to the facsimile communication means; first control means, responsive to a predetermined signal sent through the telephone line, for controlling the switch means to the second state so as to effect the facsimile communication; sound detecting means for detecting a sound signal sent through the telephone line; and second control means for switching the switch means from the second state to the first state so as to effect the voice communication when no sound signal is detected by the sound detecting means over a predetermined time period after termination of the facsimile communication effected by the first control means.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 4 is a flowchart of a control routine to be executed by the controller for controlling the operation of the facsimile apparatus;

FIG. 6 is a flowchart of a control routine to be executed by a controller for controlling the operation of the telephone terminal apparatus.

DESCRIPTION OF THE PREFERRED EMBODIMENT

Now, preferred embodiments of the present invention will be described hereinbelow with reference to the accompanying drawings.

Figure 1:
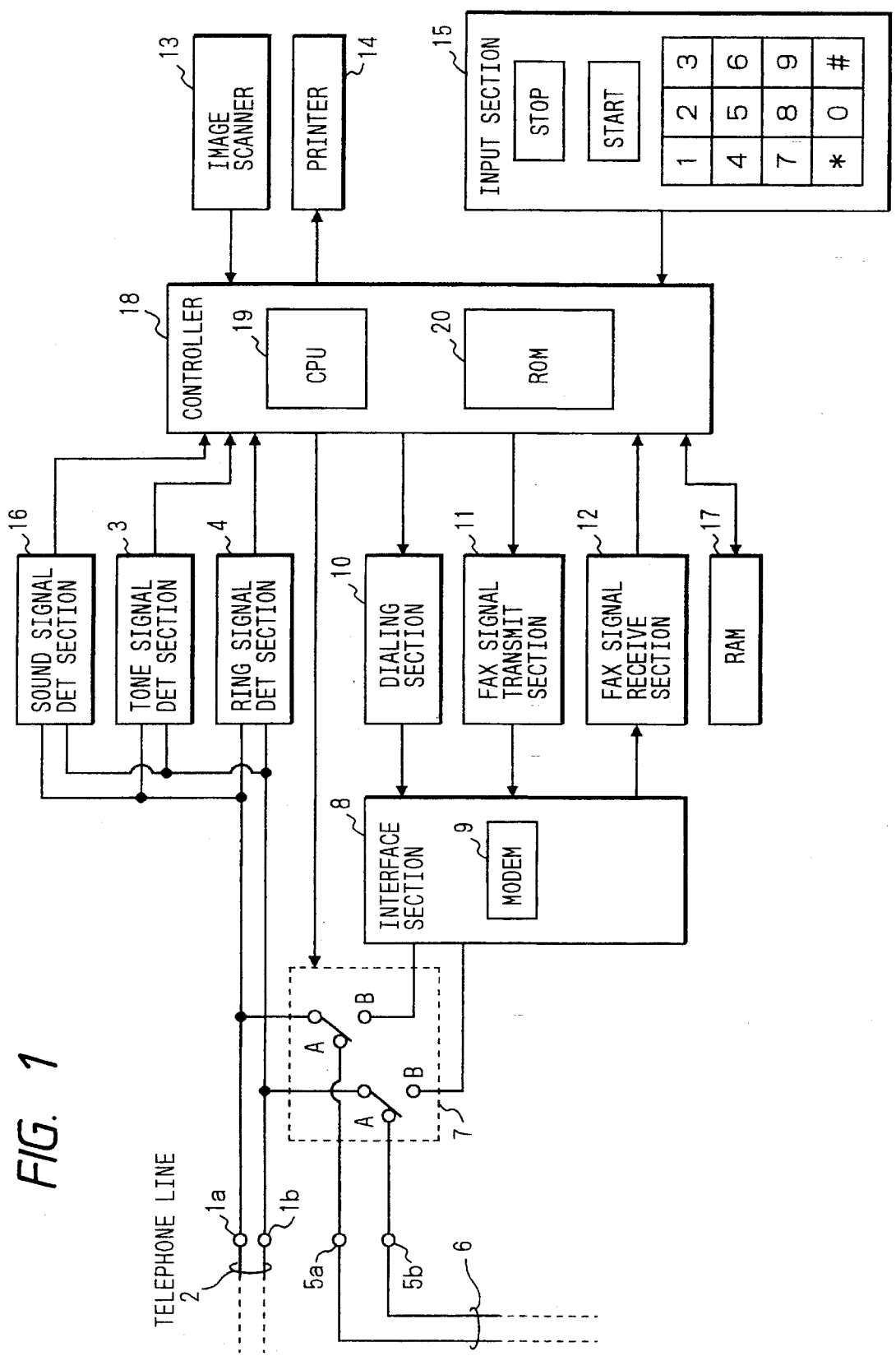
FIG. 1 is a block diagram showing the schematic structure of a facsimile apparatus according to a first preferred embodiment of the present invention.

FIG. 1 is a block diagram showing the schematic structure of a facsimile apparatus according to a first preferred embodiment of the present invention.

In FIG. 1, symbols 1a and 1b denote terminals for connection to a telephone line 2, and numeral 3 denotes a tone signal detecting section for detecting DTMF (dial tone multi-frequency) signals and other tone signals including a CNG signal. The DTMF signal is a push-button dial signal as is known in the art. The tone signal detecting section 3 includes a plurality of band-pass filters and detecting circuits for the respective band-pass filters. In the tone signal detecting section 3, the signal within a voice-frequency band transmitted via the telephone line 2 is filtered by the band-pass filters so as to be discriminated per frequency component. The tone signal detecting section 3 then produces a predetermined signal pattern per frequency component as a detection signal to be input to a controller 18. Accordingly, the controller 18 discriminates a particular code transmitted via the telephone line 2.

Numeral 4 denotes a ring signal detecting section for detecting a ring signal sent through the telephone line 2 from the telephone exchange. The ring signal detecting section 4 outputs a ring signal detection signal to the controller 18 when the ring signal is detected. Symbols 5a and 5b denote terminals for connection to a telephone line 6 of an external telephone set, and numeral 8 denotes a line interface section having a circuit for providing a loop current in the telephone line 2 when the ring signal is detected by the controller 18 via the ring signal detecting section 4. The interface section 8 further includes a modem section 9 for performing modulation of an outgoing image signal to be sent through the telephone line 2 and demodulation of an incoming image signal received through the telephone line 2.

Numeral 7 denotes a line switch having a pair of movable contact strips. When the contact strips are connected to terminals A, A as shown in FIG. 1, the external telephone set is directly connected to the telephone line 2. On the other hand, when the contact strips are connected to terminals B, B, the telephone line 2 is connected to the interface section 8.

Numeral 16 denotes a sound detecting section for detecting a sound signal within a predetermined frequency band sent through the telephone line 2. The predetermined frequency band is set so as to allow the sound detecting section 16 to be sensitive to a voice-indicative signal. Based on an output signal from the sound detecting section 16, the controller 18 determines presence or absence of a sound signal from the caller or the external telephone set connected at the terminals 5a and 5b.

Numeral 10 denotes a dialing section for sending a dial signal into the telephone line 2 via the interface section 8, numeral 11 denotes a facsimile (image) signal transmitting section for sending the outgoing image signal into the telephone line 2 via the interface section 8 including the modem section 9, numeral 12 denotes a facsimile (image) signal receiving section for receiving the incoming image signal sent through the telephone line 2 and the interface section 8 including the modem section 9, numeral 13 denotes an image reading section or an image scanner, and numeral 14 denotes a printing section or a printer. The printer 14 comprises a recording paper feeding mechanism and a thermal print head. The thermal print head applies a heat on a portion of the recording paper so as to print image data corresponding to the incoming image signal. Numeral 15 denotes an input section having numeric and function keys.

The controller 18 includes a CPU 19 and a ROM 20 for storing control programs. Numeral 17 denotes a RAM.

In the facsimile apparatus of this preferred embodiment, it is required to preset a particular code for prohibiting a receiving operation of the facsimile apparatus, which will be described later. This particular code is prestored in the RAM 17.

Now, the operation of the facsimile apparatus of FIG. 1 will be described hereinbelow.

In a wait or stand-by state, the contact strips of the line switch 7 are normally connected to the terminals A, A as shown in FIG. 1. Accordingly, the external telephone set is connected to the telephone line 2, while the interface section 8 is disconnected from the telephone line 2. On the other hand, when a condition is matched for operating the facsimile apparatus, the line switch 7 switches from the terminals A, A to the terminals B, B according to a switching command from the controller 18.

In the state of FIG. 1, when the ring signal is sent through the telephone line 2, the ring signal is sent to the external telephone set via the line switch 7, and simultaneously to the ring signal detecting section 4 of the facsimile apparatus. In response to a detection signal from the ring signal detecting section 4, the controller 18 starts monitoring the tone signal detecting section 3 for detecting the DTMF signal and the CNG signal and further starts monitoring the sound detecting section 16 for detecting the sound signal. A code corresponding to the foregoing particular code prestored in the RAM 17 for prohibiting the receiving operation of the facsimile apparatus is transmitted through the telephone line 2 in the form of the DTMF signal.

The facsimile apparatus of this preferred embodiment is provided with an automatic receiving operation starting function which is activated when a condition of no sound signal continues over a predetermined time period. Specifically, the controller 18 continues monitoring the output signal from the sound detecting section 16 after the ring signal is detected, so as to activate the automatic receiving operation starting function when the condition of no sound signal continues over the foregoing predetermined time period.

Accordingly, when the CNG signal is detected via the tone signal detecting section 3 or when the condition of no sound signal over the predetermined time period is detected via the sound detecting section 16, the controller 18 produces the switching command so as to switch the line switch 7 from the terminals A, A to the terminals B, B. As a result, the interface section 8 is connected to the telephone line 2 so that the facsimile signal receiving section 12 starts receiving the incoming image signal from a caller facsimile apparatus.

Figure 2:
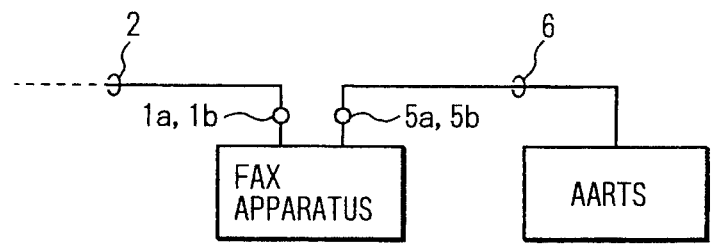
FIG. 2 is a block diagram showing the facsimile apparatus of FIG. 1 with an external telephone set connected thereto.

FIG. 2 is a block diagram schematically showing the facsimile apparatus of FIG. 1 with the external telephone set connected thereto. As appreciated, the facsimile apparatus and the external telephone set cooperatively form a telephone terminal apparatus having telephone (voice) and facsimile (image) communication functions. In FIG. 2, an automatic answering/recording telephone set (hereinafter referred to as "AARTS") is illustrated as the external telephone set.

Figure 3:
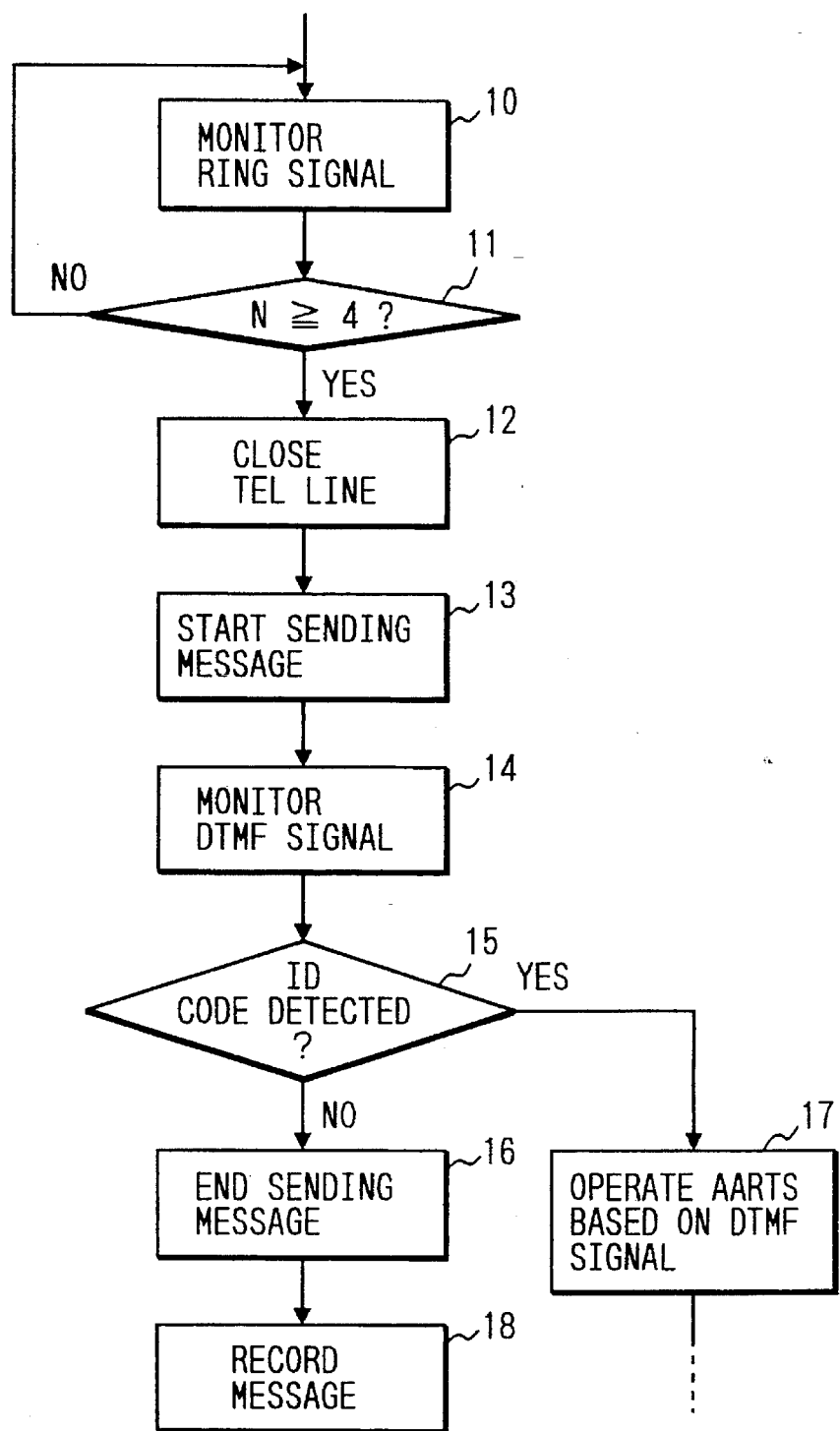
FIG. 3 is a flowchart of a control routine to be executed by a controller for controlling the operation of an automatic answering/recording telephone set.

Before describing the operation of the facsimile apparatus connected to the AARTS, the operation of the AARTS will be described hereinbelow with reference to FIG. 3. FIG. 3 is a flowchart of a control routine for controlling the operation of the AARTS.

A step 10 monitors the ring signal sent through the telephone line 2, and a step 11 determines whether the number N of the received ring signals reaches a preset value, for example, "4" in this preferred embodiment. The steps 10 and 11 are repeated until answer at the step 11 becomes positive. When answer at the step 11 is positive, i.e. the number of the received ring signals reaches "4", the routine proceeds to a step 12 where the telephone line 2 is closed in the AARTS. Subsequently, a step 13 stats reproducing a recorded outgoing message for the caller and sending it into the telephone line 2. While the recorded outgoing message is reproduced and sent to the caller, a step 14 starts monitoring a DTMF signal sent through the telephone line 2. The AARTS is assigned in advance with its own ID (identification) code, and this ID code is transmitted through the telephone line 2 in the form of the DTMF signal. The monitoring of the DTMF signal continues until the transmission of the recorded outgoing message ends at a step 16 while the DTMF signal corresponding to the assigned ID code is not detected at a step 15. When the DTMF signal corresponding to the ID code is detected at the step 15, the routine proceeds to a step 17 where the AARTS is set ready for the remote control, that is, the AARTS is set to a condition for the remote control through the telephone line 2. On the other hand, when the step 15 detects no DTMF signal corresponding to the ID code, a message of the caller is recorded in the AARTS at a step 18.

The preset value "4" at the step 11 is smaller than a preset value "6" shown at a later-described step 22 in FIG. 4 so that the telephone line 2 is first closed in the AARTS when the caller wishes the telephone communication, i.e. the voice communication.

As appreciated, after the AARTS is set ready for the remote control, the caller can remote-control the operation of the AARTS using the known commands for the AARTS in the form of the DTMF signals, such as, reproducing the recorded incoming message and changing the recorded outgoing message.

After the execution of the step 17 or 18, that is, when the caller terminates the communication, the AARTS returns to a wait or stand-by state for awaiting a next occurrence of the ring signal.

Now, the operation of the facsimile apparatus according to this preferred embodiment will be described hereinbelow with reference to FIG. 4. FIG. 4 is a flowchart of a control routine to be executed by the controller 18 for controlling the operation of the facsimile apparatus. This control routine is one of control routines prestored in the ROM 20 and selected when an absence operation mode is manually selected for connection to the AARTS.

When the ring signal is detected, a step 20 starts monitoring the CNG signal and the sound signal as described before. Simultaneously, a step 21 starts monitoring the DTMF signal as is also described before.

Subsequently, the routine proceeds to a step 22 which determines whether the number N of the received ring signals reaches a preset value, for example, "6" in this preferred embodiment. As appreciated, since the AARTS responds to the fourth ring signal, the number of the received ring signals does not normally reach "6" at the step 22. Accordingly, the step 22 produces a positive answer only when the AARTS does not respond to the ring signal due to, for example, failure.

When the number of the received ring signals reaches "6" at the step 22, when the CNG signal is detected at a step 23, or when the condition of no sound signal over the predetermine time period (hereinafter referred to as "NS condition") is detected at a step 24, the routine proceeds to a step 26 where the telephone line 2 is closed in the facsimile apparatus. Specifically, the controller 18 switches the line switch 7 from the terminals A, A to the terminals B, B and further controls the interface section 8 to form a loop of the telephone line 2. Subsequently, at a step 27, the receiving operation of the incoming image signal is effected via the interface section 8 and the facsimile signal receiving section 12.

On the other hand, when all of the steps 22, 23 and 24 produce negative answers, the routine proceeds to a step 25 which determines whether the DTMF signal corresponding to the foregoing particular code prestored in the RAM 17 for prohibiting the receiving operation of the facsimile apparatus is detected.

Accordingly, when the DTMF signal corresponding to the prestored particular code is detected at the step 25, the receiving operation of the facsimile apparatus is prohibited at a step 28. Specifically, the line switch 7 is held to the terminals A, A once the DTMF signal corresponding to the prestored particular code is detected at the step 25, that is, before either one of the steps 22, 23 and 24 produces the positive answer. Accordingly, even if the NS condition is established after the step 25 produces the positive answer, the line switch 7 is held to the terminals A, A so that the receiving operation of the facsimile is reliably prohibited.

After the execution of the step 27 or 28, that is, when the caller terminates the communication, the facsimile apparatus returns to the wait state for awaiting a next occurrence of the ring signal. As described before, in the wait state of the facsimile apparatus, the line switch 7 is held to the terminals A, A.

As appreciated from the foregoing description, in the first preferred embodiment, the telephone line 2 is first closed in the AARTS so as to send the outgoing message to the caller and to record the caller's message as soon as possible when the caller wishes the telephone communication, i.e. the voice communication. On the other hand, when the caller wishes the facsimile communication, that is, the image signal transmission, the receiving operation of the incoming image signal is effected when the CNG signal is detected in case of the caller's facsimile apparatus being operated under an automatic calling mode and when the NS condition is detected in case of the caller's facsimile apparatus being operated under a manual calling mode.

Further, as described before, in the conventional structure, when the NS condition occurs during, for example, the remote control of the AARTS to rewind the tape, the receiving operation of the facsimile apparatus is automatically started so that the remote control of the AARTS becomes inoperative. On the other hand, in the foregoing first preferred embodiment, once the DTMF signal corresponding to the prestored particular code is detected, the receiving operation of the facsimile apparatus is held ineffective even if the NS condition occurs thereafter. Accordingly, the remote control of the AARTS is ensured as opposed to the conventional structure.

In the foregoing first preferred embodiment, the AARTS is connected to the facsimile apparatus as the external telephone set so as to form the telephone terminal apparatus. However, the present invention may also apply to the facsimile apparatus in which the telephone set, such as, the AARTS is incorporated in advance so as to form a telephone terminal apparatus, or to the facsimile apparatus into which the telephone set, such as, the AARTS provided as an option is incorporated by the user so as to form a telephone terminal apparatus.

In the foregoing first preferred embodiment, the ID code of the AARTS and the prestored particular code for the facsimile apparatus are two different codes. It may be arranged, however, that the ID code of the AARTS and the particular code for the facsimile apparatus are identical with each other. In this case, the user can set the AARTS ready for the remote control and further prohibit the receiving operation of the facsimile apparatus by inputting only one code.

Now, a second preferred embodiment of the present invention will be described hereinbelow.

Figure 5:
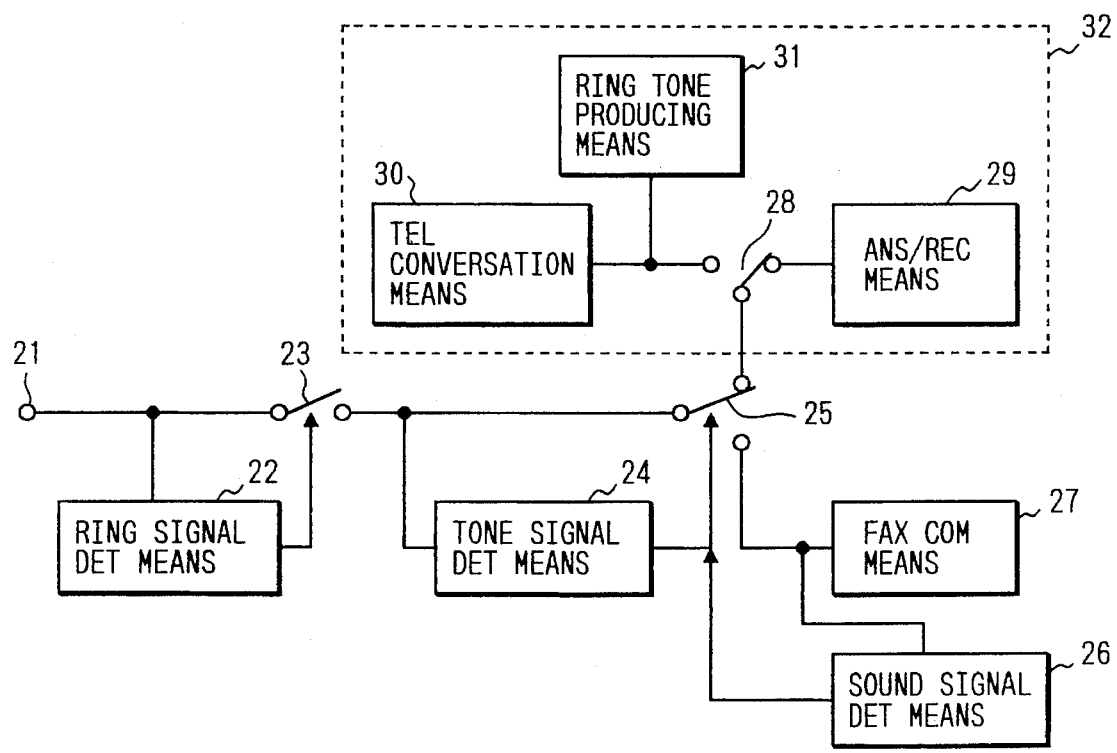
FIG. 5 is a block diagram showing the schematic structure of a telephone terminal apparatus according to a second preferred embodiment of the present invention.

FIG. 5 is a block diagram showing the schematic structure of a telephone terminal apparatus according to the second preferred embodiment.

In FIG. 5, numeral 21 denotes a terminal for connection to a telephone line, numeral 22 denotes ring signal detecting means for detecting a ring signal sent through the telephone line from the telephone exchange, and numeral 23 denotes a line switch for opening and closing the telephone line.

Numeral 24 denotes tone signal detecting means for detecting tone signals such as DTMF signals. The tone signal detecting means 24 is connected to a secondary side of the line switch 23 and outputs a detection signal in the same manner as the tone signal detecting section 3 in the first preferred embodiment. In this preferred embodiment, the DTMF signals include terminal designation signals sent from the telephone exchange for the direct inward dialing (DID). Numeral 27 denotes facsimile communication means which is activated in a facsimile communication mode, and numeral 32 denotes voice communication means which is activated in a telephone communication mode. The voice communication means 32 includes automatic answering/ recording means 29, telephone conversation means 30 and ring tone producing means 31 for sending a ring tone to the telephone conversation means 30. The automatic answering/ recording means 29 includes, such as, audio tape recorders, a magnetic disk unit or an audio recording integrated circuit (IC) for recording the incoming message from the caller, the outgoing message to be sent to the caller and the conversation between the caller and receiver. The telephone conversation means 30 includes a handset and a voice communication circuit including an amplifier.

Numeral 25 denotes a mode selection switch which switches between the facsimile communication means 27 and the voice communication means 32, that is, between the facsimile communication mode and the voice communication mode, depending on the DTMF signal monitored by the tone signal detecting means 24. Specifically, in this preferred embodiment, two particular codes are preset, one for the facsimile communication means 27 and the other for the voice communication means 32. When the terminal designation signal in the form of the DTMF signal matches one of the preset particular codes, the mode selection switch 25 is connected to the corresponding one of the facsimile communication means 27 and the voice communication means 32. Further, the mode selection switch 25 is switched to the voice communication means 32 when sound detecting means 26 detects a sound signal within a predetermined frequency band sent through the telephone line, which will be described later. The frequency band is determined so as to allow the sound detecting means 26 to be sensitive to a voice-indicative signal as described in the first preferred embodiment.

The sound detecting means 26 is connected to a terminal on a secondary side of the mode selection switch 25 and on a side of the facsimile communication mode and produces a sound detection signal when the sound signal is received through the telephone line. The facsimile communication means 27 is connected to the same terminal.

Numeral 28 denotes a presence/absence mode setting switch which switches between the telephone conversation means 30 and the automatic answering/recording means 29. The mode setting switch 28 is connected to a terminal on a secondary side of the mode selection switch 25 and on a side of the voice communication mode and is manually operated.

Now, the operation of the telephone terminal apparatus having the foregoing structure will be described with reference to FIG. 6. As appreciated, practically, the operation of the telephone terminal apparatus is controlled by a controller corresponding to the controller 18 in the first preferred embodiment. FIG. 6 is a flowchart of a control routine to be executed by the controller for controlling the operation of the telephone terminal apparatus.

A step 30 determines whether the number N of the received ring signals reaches a preset value, for example, "3" in this preferred embodiment. When answer at the step 30 is positive, a step 31 turns on the line switch 23 to close the telephone line. Subsequently, a step 32 determines based on the output from the tone signal detecting means 24 whether the DTMF signal is detected. When answer at the step 32 is positive, the routine proceeds to a step 33. On the other hand, when answer at the step 32 is negative, the routine proceeds to a step 37.

At the step 33, it is determined whether the received DTMF signal corresponds to a preset code T1 representing the facsimile communication means 27 or a preset code T2 representing the voice communication means 32. When the received DTMF signal corresponds to the preset code T1, the routine proceeds to a step 34 where the facsimile communication mode is activated so that the facsimile communication is effected at a step 35. When the facsimile communication is terminated, a step 36 determines based on the output from the sound detecting means 26 whether the sound signal is detected within a predetermined time period. When no sound signal is detected within the predetermined time period, the routine is terminated so that the telephone terminal apparatus returns to a wait or stand-by state for awaiting a next occurrence of the ring signal.

On the other hand, when the sound signal is detected within the predetermined time period or when answer at the step 33 is the preset code T2, the routine proceeds to the step 37 which determines whether the mode setting switch 28 is connected to the automatic answering/recording means 29 or the telephone conversation means 30. When the automatic answering/recording means 29 is connected, the routine proceeds to a step 38 which activates the automatic answering/recording means 29 so as to reproduce the recorded outgoing message and to send it to the caller. Subsequently, at a step 39, the incoming message from the caller is recorded. When the recording of the incoming message is finished, the routine is terminated so that the telephone terminal apparatus returns to the wait state.

On the other hand, when the mode setting switch 28 is connected to the telephone conversation means 30 at the step 37, the routine proceeds to a step 40 where the ring tone producing means 31 sends the ring tone to the telephone conversation means 30 until the handset is off-hooked at a step 41. When the handset is off-hooked at the step 41, the routine proceeds to a step 42 where the telephone conversation is allowed between the calling and called parties. When the telephone conversation is finished, the routine is terminated so that the telephone terminal apparatus returns to the wait state.

As appreciated from the foregoing description, in the second preferred embodiment, by utilizing the terminal designation signal sent from the telephone exchange for the direct inward dialing, the selection between the facsimile communication mode and the voice communication mode is reliably performed according to the caller's selection before, for example, starting the remote control of the automatic answering/recording means 29. Accordingly, the unexpected switching to the facsimile communication mode is securely prevented during, such as, the remote control of the automatic answering/recording means 29 to reproduce the recorded incoming message in the voice communication mode. Further, since the selection between the facsimile communication mode and the voice communication mode is accomplished when the corresponding DTMF signal is received, the selected communication mode is immediately effected. Moreover, even after the facsimile communication mode is selected, the voice communication mode can be effected without once disconnecting the telephone line. Accordingly, the image data and the corresponding explanatory voice message can be transmitted in series during one call when the caller wishes to do it.

It is to be understood that this invention is not to be limited to the preferred embodiments and modifications described above, and that various changes and modifications may be made without departing from the spirit and scope of the invention as defined in the appended claims.

What is claimed is:

1. A facsimile apparatus comprising:

facsimile communication means for performing a facsimile communication;

means for connecting an external telephone unit;

line switch means having a first state where a telephone line is connected to said external telephone unit and a second state where the telephone line is connected to said facsimile communication means;

voice sound detecting means for detecting a sound signal sent through said telephone line;

first control means for switching said line switch means from said first state to said second state so as to start said facsimile communication when no sound signal is detected over a predetermined time period by said sound detecting means;

code detecting means for detecting a code based on a signal sent through said telephone line; and second control means for holding said first control means inoperative when said code detecting means detects a predetermined code based on said signal sent through the telephone line.

2. The facsimile apparatus as set forth in claim 1, wherein said facsimile communication means comprises a line interface section having a modem section for performing modulation of an outgoing image signal and demodulation of an incoming image signal, facsimile signal transmitting means for transmitting the outgoing image signal via said line interface section and facsimile signal receiving means for receiving the incoming image signal via said line interface section.

3. The facsimile apparatus as set forth in claim 1, wherein said second control means holds said first control means inoperative when said code detecting means detects said predetermined code before said first control means switches said line switch means from said first state to said second state.

4. The facsimile apparatus as set forth in claim 1, wherein said signal sent through said telephone line comprises a dial tone multi-frequency signal.

5. A facsimile apparatus comprising:

facsimile communication means for performing a facsimile communication;

means for connecting an external telephone unit;

line switch means having a first state where a telephone line is connected to said external telephone unit and a second state where the telephone line is connected to said facsimile communication means;

sound detecting means for detecting a voice sound signal sent through said telephone line;

storing means for storing a predetermined code;

first control means for switching said line switch means from said first state to said second state so as to start said facsimile communication when no sound signal is detected over a predetermined time period by said sound detecting means;

code detecting means for detecting a code based on a signal sent through said telephone line; and second control means for holding said first control means inoperative when said code detected by said code detecting means coincides with said predetermined code stored by said storing means.

6. The facsimile apparatus as set forth in claim 5, wherein said facsimile communication means comprises a line interface section having a modem section for performing modulation of an outgoing image signal and demodulation of an incoming image signal, facsimile signal transmitting means for transmitting the outgoing image signal via said line interface section and facsimile signal receiving means for receiving the incoming image signal via said line interface section.

7. The facsimile apparatus as set forth in claim 5, wherein said second control means holds said first control means inoperative when said code detecting means detects said predetermined code before said first control means switches said line switch means from said first state to said second state.

8. The facsimile apparatus as set forth in claim 5, wherein said signal sent through said telephone line comprises a dial tone multi-frequency signal.

9. A facsimile apparatus comprising:

facsimile communication means for performing a facsimile communication;

means for connecting an external telephone unit;

line switch means having a first state where a telephone line is connected to said external telephone unit and a second state where the telephone line is connected to said facsimile communication means;

means for detecting a facsimile communication start signal sent through said telephone line;

first control means for switching said line switch means from said first state to said second state so as to start said facsimile communication when said facsimile communication start signal is detected by said detecting means;

code detecting means for detecting a code based on a signal sent through said telephone line; and second control means for holding said first control means inoperative when said code detecting means detects a predetermined code based on said signal sent through the telephone line.

10. The facsimile apparatus as set forth in claim 9, wherein said facsimile communication means comprises a line interface section having a modem section for performing modulation of an outgoing image signal and demodulation of an incoming image signal, facsimile signal transmitting means for transmitting the outgoing image signal via said line interface section and facsimile signal receiving means for receiving the incoming image signal via said line interface section.

11. The facsimile apparatus as set forth in claim 9, wherein said second control means holds said first control means inoperative when said code detecting means detects said predetermined code before said first control means switches said line switch means from said first state to said second state.

12. The facsimile apparatus as set forth in claim 9, wherein said signal sent through said telephone line comprises a dial tone multi-frequency signal.

13. A facsimile apparatus comprising:

facsimile communication means for performing a facsimile communication;

means for connecting an external telephone unit;

line switch means having a first state where a telephone line is connected to said external telephone unit and a second state where the telephone line is connected to said facsimile communication means;

storing means for storing a predetermined code;

means for detecting a facsimile communication start signal sent through said telephone line;

first control means for switching said line switch means from said first state to said second state so as to start said facsimile communication when said facsimile communication start signal is detected by said detecting means;

code detecting means for detecting a code based on a signal sent through said telephone line; and second control means for holding said first control means inoperative when said code detected by said code detecting means coincides with said predetermined code stored by said storing means.

14. The facsimile apparatus as set forth in claim 13, wherein said facsimile communication means comprises a line interface section having a modem section for performing modulation of an outgoing image signal and demodulation of an incoming image signal, facsimile signal transmitting means for transmitting the outgoing image signal via said line interface section and facsimile signal receiving means for receiving the incoming image signal via said line interface section.

15. The facsimile apparatus as set forth in claim 13, wherein said second control means holds said first control means inoperative when said code detecting means detects said predetermined code before said first control means switches said line switch means from said first state to said second state.

16. The facsimile apparatus as set forth in claim 13, wherein said signal sent through said telephone line comprises a dial tone multi-frequency signal.

17. A telephone terminal apparatus comprising:

facsimile communication means for performing a facsimile communication;

voice communication means for performing a voice communication;

switch means having a first state where a telephone line is connected to said voice communication means and a second state where the telephone line is connected to said facsimile communication means;

means for detecting a facsimile communication start signal sent through said telephone line;

first control means for controlling said switch means to said second state so as to start said facsimile communication when said facsimile communication start signal is detected by said detecting means;

code detecting means for detecting a code based on a signal sent through said telephone line; and second control means for holding said first control means inoperative when said code detecting means detects a predetermined code based on said signal sent through the telephone line.

18. The telephone terminal apparatus as set forth in claim 17, wherein said facsimile communication means comprises a line interface section having a modem section for performing modulation of an outgoing image signal and demodulation of an incoming image signal, facsimile signal transmitting means for transmitting the outgoing image signal via said line interface section and facsimile signal receiving means for receiving the incoming image signal via said line interface section.

19. The telephone terminal apparatus as set forth in claim 17, wherein said voice communication means includes an automatic answering/recording means for sending a voice message into the telephone line and recording a voice message received through the telephone line.

20. The telephone terminal apparatus as set forth in claim 17, wherein said signal sent through said telephone line comprises a dial tone multi-frequency signal.

21. A telephone terminal apparatus comprising:

facsimile communication means for performing a facsimile communication;

voice communication means for performing a voice communication;

switch means having a first state where a telephone line is connected to said voice communication means and a second state where the telephone line is connected to said facsimile communication means;

sound detecting means for detecting a voice sound signal sent through said telephone line;

first control means for controlling said switch means to said second state so as to start said facsimile communication when no sound signal is detected over a predetermined time period by said sound detecting means;

code detecting means for detecting a code based on a signal sent through said telephone line; and second control means for holding said first control means inoperative when said code detecting means detects a predetermined code based on said signal sent through the telephone line.

22. The telephone terminal apparatus as set forth in claim 21, wherein said facsimile communication means comprises a line interface section having a modem section for performing modulation of an outgoing image signal and demodulation of an incoming image signal, facsimile signal transmitting means for transmitting the outgoing image signal via said line interface section and facsimile signal receiving means for receiving the incoming image signal via said line interface section.

23. The telephone terminal apparatus as set forth in claim 21, wherein said voice communication means includes an automatic answering/recording means for sending a voice message into the telephone line and recording a voice message received through the telephone line.

24. The telephone terminal apparatus as set forth in claim 21, wherein said signal sent through said telephone line comprises a dial tone multi-frequency signal.

* * * * *